(12) United States Patent
Vitalis et al.

(10) Patent No.: US 12,065,189 B2
(45) Date of Patent: Aug. 20, 2024

(54) METHOD FOR OPERATING A MOTOR-ADJUSTABLE STEERING COLUMN AND MOTOR-ADJUSTABLE STEERING COLUMN FOR A MOTOR VEHICLE

(71) Applicants: thyssenkrupp Presta AG, Eschen (LI); thyssenkrupp AG, Essen (DE)

(72) Inventors: Daniel Vitalis, Budapest (HU); Andreas Willi, Lauterach (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 313 days.

(21) Appl. No.: 17/626,372

(22) PCT Filed: Jul. 8, 2020

(86) PCT No.: PCT/EP2020/069164
§ 371 (c)(1),
(2) Date: Jan. 11, 2022

(87) PCT Pub. No.: WO2021/008950
PCT Pub. Date: Jan. 21, 2021

(65) Prior Publication Data
US 2022/0258789 A1 Aug. 18, 2022

(30) Foreign Application Priority Data
Jul. 12, 2019 (DE) ................... 10 2019 004 840.7

(51) Int. Cl.
*B62D 1/181* (2006.01)
*B62D 1/185* (2006.01)
(Continued)

(52) U.S. Cl.
CPC ............. *B62D 1/181* (2013.01); *B62D 1/185* (2013.01); *B62D 1/187* (2013.01); *B62D 1/189* (2013.01)

(58) Field of Classification Search
CPC ........ B62D 1/181; B62D 1/185; B62D 1/187; B62D 1/189
(Continued)

(56) References Cited

U.S. PATENT DOCUMENTS 4,661,752 A 4/1987 Nishikawa et al.
7,597,357 B2 10/2009 Barcat
(Continued)

FOREIGN PATENT DOCUMENTS

CN 204452560 U 7/2015
DE 35 32 102 A1 6/1986
(Continued)

OTHER PUBLICATIONS

English translation of JP H11-70880 (Year: 1999).*
English Translation of International Search Report issued in PCT/EP2020/069164 dated Oct. 7, 2020.

*Primary Examiner* — Erick R Solis
(74) *Attorney, Agent, or Firm* — thyssenkrupp North America, LLC

(57) ABSTRACT

A method for operating a motor-adjustable steering column may be employed by a motor vehicle with an actuating unit supported by a supporting unit. A steering spindle may be rotatably supported in the actuating unit. The actuating unit may be adjustable relative to the supporting unit by means of at least one adjustment drive. The adjustment drive is controlled by a control unit, and the adjustment speed caused by the adjustment drive is determined based on measurement data of a sensor. The control unit controls the adjustment drive in a control loop based on a control deviation between a specifiable speed profile and the determined adjustment speed.

11 Claims, 2 Drawing Sheets

(51) Int. Cl.
*B62D 1/187* (2006.01)
*B62D 1/189* (2006.01)

(58) Field of Classification Search
USPC .............................. 701/41, 42; 280/775, 779
See application file for complete search history.

(56) References Cited

U.S. PATENT DOCUMENTS

| | | |
|---|---|---|
| 2002/0011724 A1 | 1/2002 | Satou et al. |
| 2005/0050979 A1* | 3/2005 | Barcat .................... B62D 1/181 |
| | | 74/495 |
| 2005/0285383 A1 | 12/2005 | Yae et al. |
| 2007/0176405 A1 | 8/2007 | Barcat |
| 2009/0278711 A1 | 11/2009 | Lohberg et al. |
| 2020/0230890 A1* | 7/2020 | Hirschauer ............ B62D 1/185 |
| 2021/0291894 A1* | 9/2021 | Rouleau .................... H02P 6/24 |

FOREIGN PATENT DOCUMENTS

| | | |
|---|---|---|
| DE | 10 2004 010 805 A1 | 9/2005 |
| DE | 10 2010 005 802 A1 | 7/2011 |
| EP | 1 927 526 A1 | 6/2008 |
| JP | H07 319481 A | 12/1995 |
| JP | H11 70880 A | 3/1999 |
| JP | 2000289626 A | 10/2000 |
| JP | 2009005494 A | 1/2009 |
| JP | 2010184586 A | 8/2010 |

* cited by examiner

METHOD FOR OPERATING A MOTOR-ADJUSTABLE STEERING COLUMN AND MOTOR-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2020/069164, filed Jul. 8, 2020, which claims priority to German Patent Application No. DE 10 2019 004 840.7, filed Jul. 12, 2019, the entire contents of both of which are incorporated herein by reference.

FIELD

The present disclosure generally relates to steering columns, including steering columns for motor vehicles and methods for operating motor-adjustable steering columns.

BACKGROUND

Motor-adjustable steering columns comprise a supporting unit and an actuating unit supported by the supporting unit, in which a steering spindle is rotatably supported and which is adjustable relative to the supporting unit by means of at least one adjustment drive, wherein the adjustment can be carried out in a longitudinal direction and/or in the height direction. The adjustment drive can be self-locking, so that the steering column remains fixed in the set position. The adjustment drive includes an electric motor which is actively connected to a spindle drive, so that this converts the rotational movement of the rotor shaft of the electric motor into a translational movement and this leads to an adjustment of the actuating unit relative to the supporting unit. The control of the electric motor of electrically adjustable steering columns is carried out by means of an ECU and semiconductor switches. The adjustment speed over the adjustment path is specified by the motor design or by the control by means of the ECU.

The electric motors used are usually operated at revolution rates which cause noise in the audible frequency range. The adjustment speed and thus also the noise development is subject to periodic frequency modulations, which are caused, for example, by tolerance deviations of the components used in the drive train of the adjustment drive and other external influences. Even a frequency modulation of 2-3% is perceived by vehicle occupants as disturbing and leaves an acoustic impression that suggests insufficient manufacturing quality.

From EP 1 927 526 A1 a method for operating an electrically-adjustable steering column is known, in which a speed control unit outputs a speed control command for the position adjustment of the steering column. Based on the speed control command and a defined transmission function, an optimal value control module determines a torque control command with which the target speed is achieved. Furthermore, a disturbance load estimation device is provided, which determines a disturbance load from a deviation between a load torque and the torque control command, with which the output side of the optimal value control module is additionally loaded.

EP 1 927 526 A1 thus describes a control of the adjustment speed with a disturbance variable added on the basis of an estimated interference load. A disadvantage of this method is the complex structure of the controller and the resulting inertia of the control. Due to the previously known control, a reduced dependence can be achieved of the adjustment speed on a number of external parameters, such as the supply voltage, friction, temperature or weight. Due to the control inertia, however, it is in particular not possible to counteract the previously described frequency modulations of the adjustment drive.

Thus a need exists for a method for operating a motor-adjustable steering column and a motor-adjustable steering column for a motor vehicle with an improved acoustic impression during the adjustment of the steering column.

DETAILED DESCRIPTION

Figure 1:
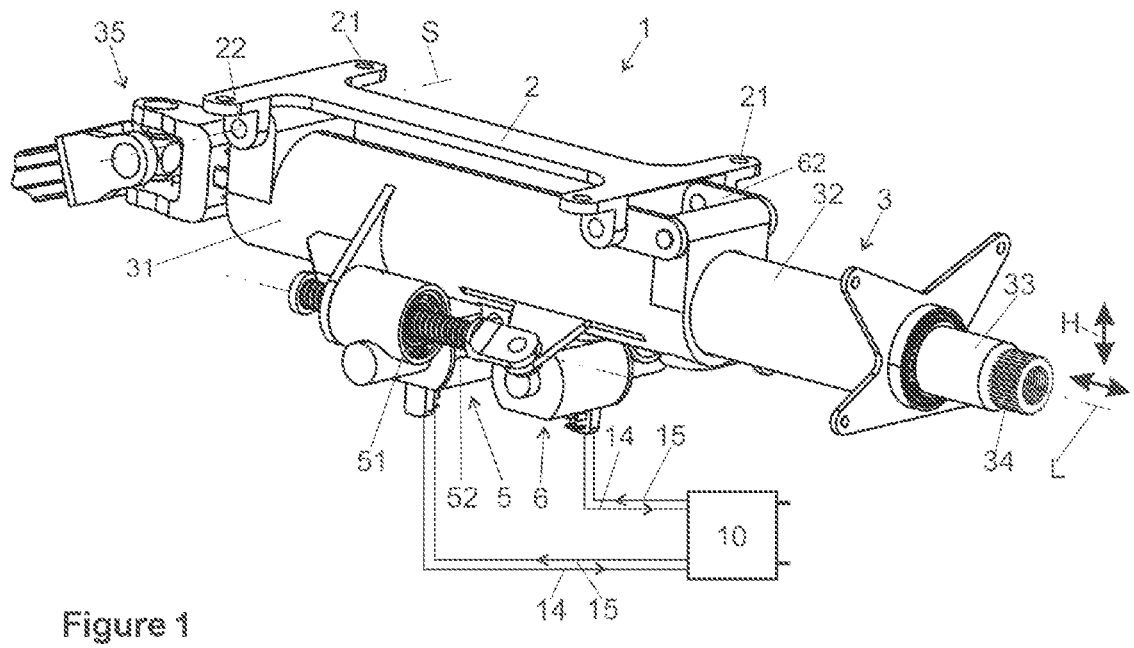
FIG. 1 is a schematic perspective view of an example motor-adjustable steering column.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

This creates a method for operating a motor-adjustable steering column for a motor vehicle with a supporting unit and an actuating unit supported by the supporting unit, in which a steering spindle is rotatably supported and which is longitudinally adjustable and/or height-adjustable relative to the supporting unit by means of at least one adjustment drive, wherein the adjustment drive is controlled by a control unit and on the basis of measurement data from a sensor and an adjustment speed caused by the adjustment drive is determined. With the method according to the invention, it is further provided that the control unit controls the adjustment drive in a control loop on the basis of a control deviation between a specifiable speed profile and the specified adjustment speed.

In the context of the invention, the sensor for determining the adjustment speed is to be understood as a determination unit which determines or ascertains the adjustment speed in any way. This can be done either directly by measuring the adjustment speed or indirectly by calculating the adjustment speed from other determined values or on the basis of which a conclusion is drawn about the adjustment speed. For example, the adjustment speed can be determined from the revolution rate of the electric motor on the basis of the known transmission ratio of the spindle drive.

Preferably, the actuation unit is adjustable relative to the supporting unit longitudinally and/or in the height direction.

By controlling the speed on the basis of the detected adjustment speed as an input variable, the reaction time of the control unit to changing external conditions is significantly shortened. This makes it possible to correct inconsistencies in the controlled system, such as irregularities of the adjustment drive or the adjustment system. The controlled system comprises at least one of the following parts: a guide system of the steering column, the connection to the steering train and/or the adjustment drive comprising the adjustable motor and the transmission.

For the controller, a PI controller and/or a PID controller is/are preferably used. The control parameters of the control loop can be fixed. Alternatively, the control parameters can also be updated, for example by means of route identification.

Preferably, the motor-adjustable steering column comprises an electric motor as an adjustment drive, wherein particularly preferably an adjustment drive is provided for each of the height adjustment and the longitudinal adjustment. The control is preferably applied for the longitudinal adjustment and/or height adjustment, wherein this adjustment is carried out simultaneously and/or sequentially. The electric motor is preferably controlled by means of pulse modulation (PWM).

Preferably, the speed profile corresponds to a constant speed of the adjustment drive during the adjustment. This choice of speed profile further improves the acoustic impression of the steering column, since not only are frequency modulations corrected, but also the fundamental frequency of the steering column remains essentially the same.

Alternatively, the position of the adjustable steering column can be repeatedly determined during the adjustment and the speed profile of the adjustment drive can be specified on the basis of a position-dependent speed characteristic. If the adjustment system of the motor-adjustable steering column, in particular for height adjustment, includes a lever system for transmitting the adjustment movement from the adjustment drive to the actuating unit, a constant adjustment speed of the adjustment drive can result in a constantly changing adjustment speed of the actuating unit. In order to increase the comfort of the driver, a position-dependent speed characteristic can be used, which reduces the position-dependent change in the adjustment speed of the actuating unit caused by the adjustment system. In particular, the position-dependent speed characteristic can encode an essentially constant adjustment speed of the actuating unit relative to the supporting unit. A constant adjustment speed is understood to mean a maximum deviation of ±5% of an averaged adjustment speed.

The speed profile preferably has a starting ramp at the beginning of the adjustment and a stopping ramp at the end of the adjustment. Due to a gentle start-up and stopping behavior, load peaks and, in particular, rattling noises in the adjustment system can be reduced. The starting ramp is an acceleration. The starting ramp may preferably be linear or progressive or degressive.

In a preferred exemplary embodiment, an evaluation unit is provided which evaluates at least one manipulated variable of the control loop during the adjustment for the identification of inconsistencies in the control section of the control loop. Information about the instantaneous load on the adjustment system can be derived from the manipulated variable of the control loop.

Particularly preferably, the position of the steering column is determined on the basis of the identified inconsistencies in the control system. For example, the required manipulated variable changes depending on the position of the steering column, especially when using a lever system for the power transmission of the adjustment drive. By evaluating the manipulated variable, the position of the steering column can thus be concluded. The evaluation can preferably also be used for collision or wear detection. Preferably, the evaluation unit is designed to transmit the results of the evaluation to an on-board system. The manipulated variable can be, for example, a voltage setpoint for the adjustment drive. A collision is understood to mean the unwanted contact with a foreign body, such as human extremities.

The evaluation unit can also carry out threshold value monitoring of the at least one manipulated variable and can cause a shutdown of the adjustment drive if the threshold value is exceeded. By switching off the adjustment drive, effective anti-pinch protection for the driver can be ensured.

The adjustment speed is preferably determined from the revolution rate of a shaft driven by the adjustment drive. In particular, the revolution rate detection can be carried out directly at the output shaft of the adjustment drive. Alternatively, the adjustment speed can also be determined by detecting the movement of the actuating unit. The adjustment speed can be derived from the detection of an absolute or relative position. For example, magnetic sensors or inductive sensors can be used as sensors.

Preferably, for the determination of the revolution rate, one or more sensor units distributed in the circumferential direction around the shaft are provided, each of which outputs a pulsed sensor signal, and the speed is determined in each case on the basis of a period duration of the sensor signal in which a pulse was last registered. When using multiple sensor units, a particularly accurate determination of the speed is made possible. The adjustment speed is updated several times per revolution of the shaft. Since each sensor unit is designed for independent speed measurement, the determined adjustment speed is nevertheless independent of the positioning tolerances of the sensor units relative to each other.

In a preferred embodiment, the speed profile is specified with one or more interference frequencies in the audible frequency range. By deliberately applying one or more interference frequencies in the audible range to the speed profile, the noise development of the adjustment drive can be influenced. This sound design optimizes the acoustic impression of the adjustment system and gives the vehicle occupants a particularly valuable impression.

In terms of the device, the object is achieved by a motor-adjustable steering column for a motor vehicle with a supporting unit and an actuating unit supported by the supporting unit. In the actuating unit, a steering spindle of the steering column is rotatably mounted and the actuating unit is adjustable relative to the supporting unit by means of at least one adjustment drive. The steering column also includes a control unit for controlling the adjustment drive and a sensor for determining an adjustment speed of the actuating unit. The adjustment drive, the sensor and the control unit are integrated into a control loop for control of the adjustment drive based on a control deviation between a specifiable speed profile and the determined adjustment speed. The steering column may be designed in particular to carry out the method described above.

In the different figures, the same parts are always provided with the same reference characters and are therefore usually named or mentioned only once.

Figure 2:
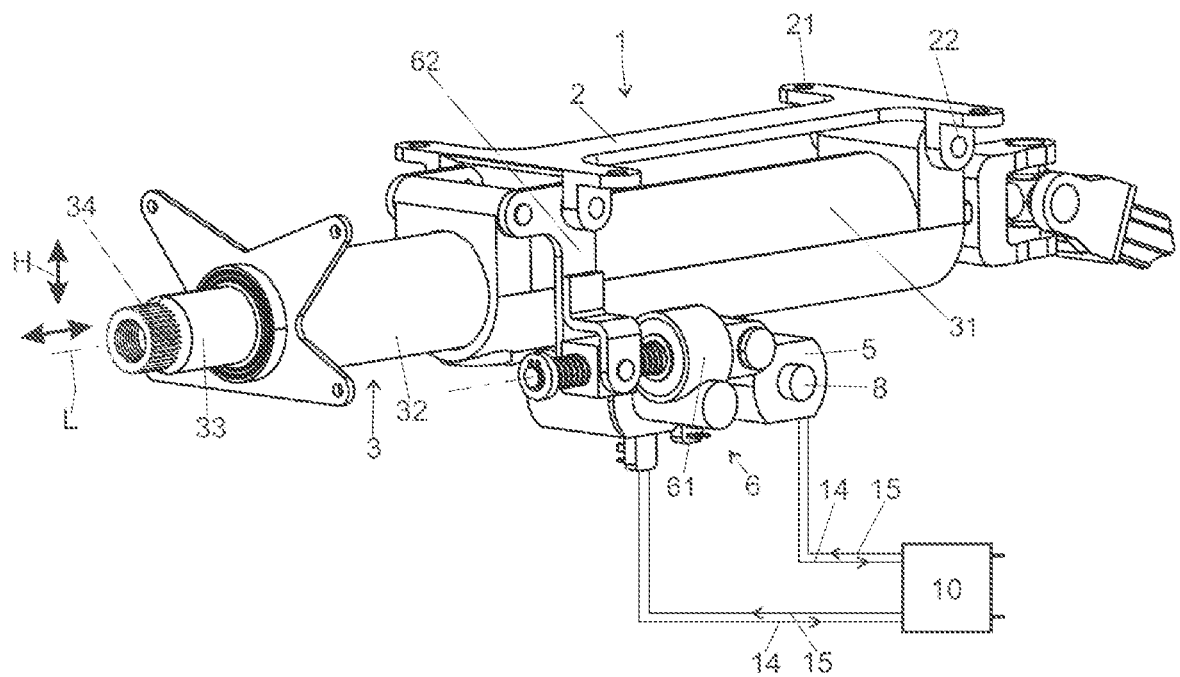
FIG. 2 is a further schematic perspective view of the steering column according to FIG. 1 from a different viewing angle.

FIG. 1 shows a steering column 1 according to the invention in a schematic perspective view from diagonally top left to the rear end, related to the direction of travel of a vehicle which is not shown, where a steering wheel which is not shown here is held in the operating region. FIG. 2 shows the steering column 1 in a view from the opposite side, i.e. seen from the bottom right.

The steering column 1 comprises a supporting unit 2, which is in the form of a bracket, which has mounting holes 21 for attachment to a vehicle body which is not shown. An actuating unit 3 is held by the supporting unit 2 with the interposition of a jacket unit 31, wherein the actuating unit 3 is arranged in the jacket unit 31 telescopically. The actuating unit 3 comprises a jacket tube 32 and a steering spindle 33, which is supported rotatably around a longitudinal axis L in the jacket tube 32. At the rear end of the steering spindle 33, a mounting section 34 is formed, to which a steering wheel which is not shown can be attached. At the front end, the steering spindle 33 is connected to a fork of a universal joint 35 so as to transmit torque.

The actuating unit 3 is adjustable longitudinally and in the height direction relative to the supporting unit 2 by means of two adjustment drives 5, 6, as indicated by the double arrows L and H. For this purpose, the adjustment drive 5 for longitudinal adjustment is coupled to a spindle nut 51 via a transmission. The spindle nut 51 is engaged with a threaded spindle 52, which is coupled to the jacket tube 32 and shifts it in the longitudinal direction L when the spindle nut 51 is driven.

The adjustment drive 6 for the height adjustment actuates a rotatable actuating lever 62 via a second threaded drive 61, wherein the actuating lever 62 connects the jacket unit 31 to the supporting unit 2. When the actuating lever 62 is operated, the actuating unit 3 is therefore swiveled relative to the supporting unit around a horizontal swivel axis S defined by a swivel bearing 22 and is thus adjusted in the height direction. Due to the use of a lever system for force transmission, the resulting adjustment speed of the actuating unit 3 for a constant drive speed of the adjustment drive 6 is dependent on the respective position of the actuating unit 3.

Figure 3:
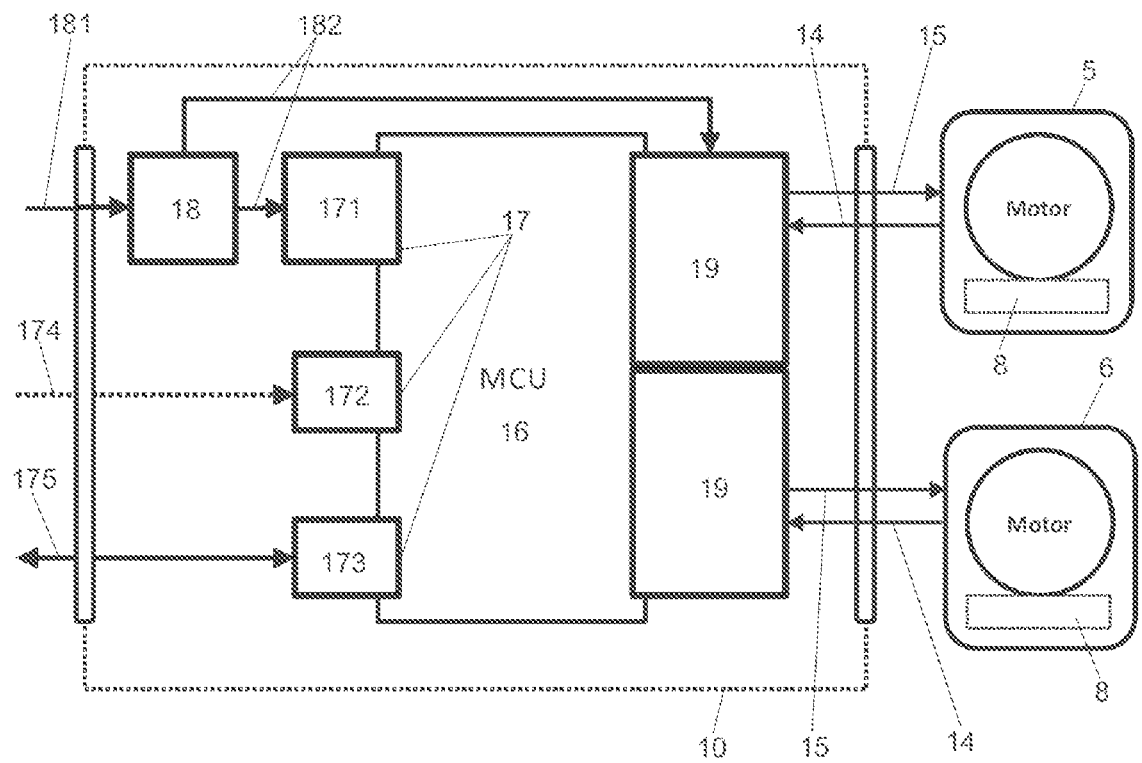
FIG. 3 is a schematic view of a control unit of the steering column according to FIGS. 1 and 2.

In FIG. 3, the structure of the control unit 10 of the steering column according to the invention according to FIGS. 1 and 2 is shown schematically. The control unit 10 contains an MCU (Micro-Control-Unit) 16 and MDUs (Motor Driver Units) 19 for controlling the adjustment drives 5, 6. To control the adjustment drives, the MDU 19 outputs command values 15 to the respective adjustment drives 5, 6. By means of sensors 8, i.e. at least one sensor 8 per adjustment drive, an adjustment speed caused by the respective adjustment drive 5, 6 is determined, for which the sensor 8 outputs a sensor signal 14. In the exemplary embodiment shown, the sensors 8 are arranged within the adjustment drive 5, 6 as rotor position sensors. However, it is also conceivable to determine the adjustment speed 9 on any other component driven by the adjustment drive 5, 6, in particular each driven shaft. Also by way of example it is provided in FIG. 3 that the MDUs 19 have a sensor interface as an input for the sensor signal 14. Alternatively, the sensor signal 14 can also be transmitted directly to the MCU 16 via another input.

According to the exemplary embodiment of FIG. 3, the MCU 16 has three interfaces 17: A power supply interface 171, a switching input 172 and a bus interface 173. The power supply interface 171 is connected via a line filter 18 to a line voltage 181, for example a vehicle electrical system. The line filter 18 provides an interference-suppressed and/or buffered voltage 182 at the power supply interface 171 and for the MDUs 19.

The switching input 172 is preferably connected to a (not shown) switching element, for example a rocker switch or a joystick switch, a button or the like, which provides a switching signal 174. By means of the switching element, the adjustment of the actuating unit in the longitudinal and/or height direction can be effected by the driver.

The bus interface 173 is used to connect the adjustable steering column to a vehicle bus, for example a CAN bus or a LIN bus, via a signal line 175. By connecting to a vehicle bus, information can be exchanged bidirectionally. For example, an automatic adjustment of the steering column can be effected in certain driving situations. So, for example, exiting can be facilitated when the ignition is switched off or even in the event of an accident. Furthermore, it may be provided that the actuating unit is transferred to a fully retracted position (stowage position) when the vehicle is operated in an autonomous driving mode. Furthermore, diagnostic information of the control unit 10 can be output to the vehicle controller via the bus interface 173 or stored in a storage unit.

Figure 4:
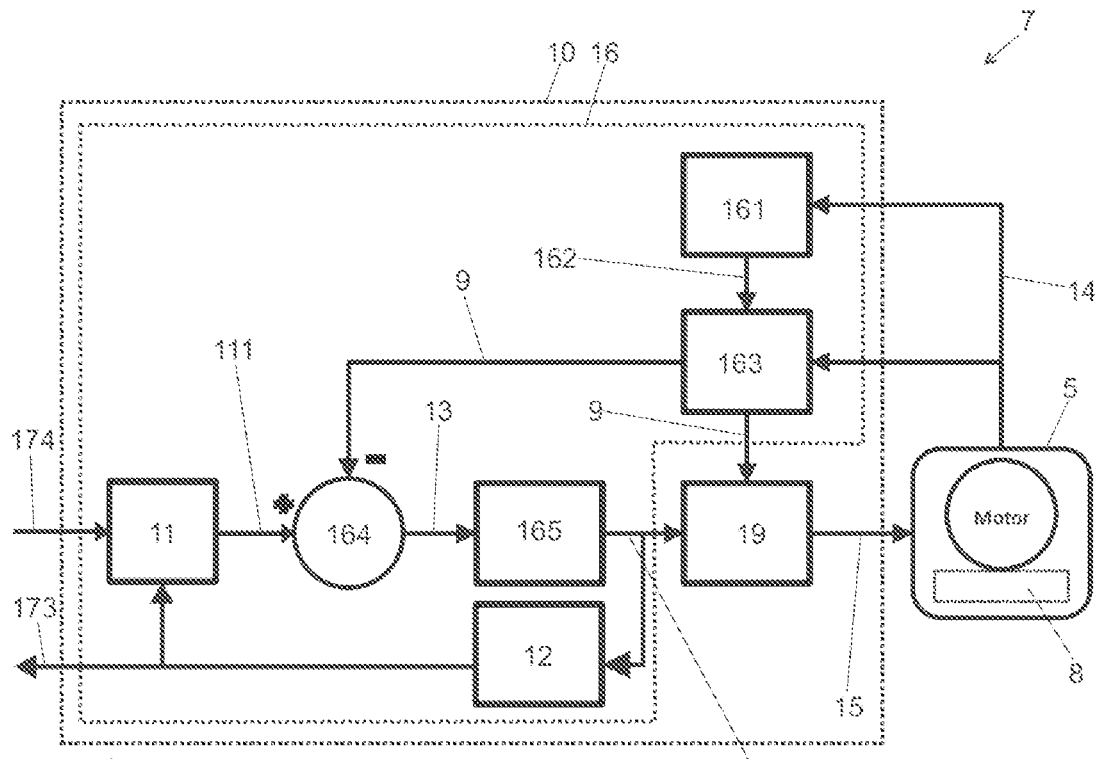
FIG. 4 is a block diagram of a control loop of the steering column according to FIGS. 1 and 2.

FIG. 4 shows schematically a block diagram of the control loop of the steering column according to the invention according to FIGS. 1 and 2. In the MCU 16 a speed profile 11 is stored, which specifies a speed setpoint as a reference variable 111 depending on the switching signal 174 and/or a command received via the signal line 175. In the differentiator 164, a control deviation 13 is determined as the difference between the reference variable 111 and the measured adjustment speed 9 and is passed on to a controller 165. The controller 165 outputs a manipulated variable 166, for example a motor voltage. The manipulated variable 166 is passed on to the MDU 19 for the determination of a PWM signal and for the subsequent control of the adjustment drive 5 by means of a command value 15. In an alternative embodiment, the determination of the PWM signal can be carried out in a separate processing step within the MCU 16.

As shown in FIG. 4, an evaluation unit 12 may be provided, which evaluates the manipulated variable 166 of the control loop 7 for the identification of inconsistencies in the controlled system during the adjustment. The evaluation unit 12 may have an output to output evaluation results to the bus interface 173 or for taking into account in the speed profile 11. For example, the evaluation unit may be designed to determine the position of the steering column 1 on the basis of the identified inconsistency in the controlled system. Also, the evaluation unit 12 can carry out a threshold value monitoring of the manipulated variable 166 and if the threshold value is exceeded, can cause a shutdown of the adjustment drive 5. Thus, safety functions such as collision detection, which can also include anti-pinch protection, can be implemented.

The sensor 8 outputs a preferably pulsed sensor signal 14 which is provided to a timer 161 and a speed calculation module 163. The timer 161 is designed to determine a period duration of the sensor signal 14, for example by edge detection of a pulsed sensor signal. The determined period duration is transmitted in the form of a time signal 162 to the speed calculation module 163. The speed calculation module 163 calculates the adjustment speed 9 from the time signal 162 and the associated position change according to the sensor signal 14, wherein the adjustment speed 9 is transmitted to the differentiator 164. The calculated adjustment speed 9 is additionally transmitted to the MDU 19 for the determination of the PWM signal.

Although in FIG. 4 reference is made as an example to the adjustment drive 5 for the longitudinal adjustment of the steering column 1, the above statements apply accordingly to the adjustment drive 6 for height adjustment of the steering column 1.

REFERENCE CHARACTER LIST

1 Steering column
2 Supporting unit
21 Attachment holes
22 Swivel bearing
3 Actuating unit
31 Jacket unit
32 Jacket tube
33 Steering spindle
34 Mounting section
5 Adjustment drive
51 Spindle nut
52 Threaded spindle
6 Adjustment drive
61 Threaded drive
62 Actuating lever
7 Control loop
8 Sensor
9 Adjustment speed
10 Control unit
11 Speed profile
111 Reference variable
12 Evaluation unit
13 Control deviation
14 Sensor signal
15 Command value
16 MCU
161 Timer
162 Time signal
163 Speed calculation module
164 Differentiator
165 Controller
166 Manipulated variable
17 Interfaces
171 Power supply interface
172 Switch input
173 Bus interface
174 Switching signal
175 Signal line
18 Line filter
181 Line voltage
182 Interference-suppressed voltage
19 MDU
S Swivel axis
L Longitudinal direction
H Height direction

What is claimed is:

1. A method for operating a motor-adjustable steering column for a motor vehicle that includes an actuating unit that is supported by a supporting unit, wherein a steering spindle is rotatably supported in the actuating unit, wherein the actuating unit is adjustable relative to the supporting unit by way of an adjustment drive, the method comprising:
controlling the adjustment drive with a control unit;
determining an adjustment speed caused by the adjustment drive based on measurement data of a sensor,
wherein the control unit controls the adjustment speed in a control loop based on a control deviation between a speed profile that is specifiable and the adjustment speed that is determined,
determining, with an evaluation unit and during the controlling of the adjustment speed, a manipulated variable of the control loop,
identifying, based on the manipulated variable, an inconsistency in a controlled system of the control loop, and
determining a position of the steering column based on the identified inconsistency.

2. The method of claim 1 wherein the speed profile during adjustment of the actuating unit corresponds to a constant speed of the adjustment drive.

3. The method of claim 1 comprising:
repeatedly determining a position of the motor-adjustable steering column during adjustment of the actuating unit; and
specifying the speed profile of the adjustment drive based on a position-dependent speed characteristic.

4. The method of claim 3 wherein the position-dependent speed characteristic encodes a substantially constant adjustment speed of the actuating unit relative to the supporting unit.

5. The method of claim 1 wherein the speed profile includes a starting ramp at a beginning of an adjustment of the actuating unit and a stopping ramp at an end of the adjustment.

6. The method of claim 1 wherein the evaluation unit performs threshold value monitoring of the manipulated variable and causes a shutdown of the adjustment drive when a threshold value is exceeded.

7. The method of claim 1 comprising determining the adjustment speed from a revolution rate of a shaft driven by the adjustment drive.

8. The method of claim 7 wherein for the determination of the revolution rate one or more sensor units distributed in a circumferential direction around the shaft are provided, wherein each of the one or more sensor units outputs a pulsed sensor signal, wherein the revolution rate is determined in each case based on a period duration of the pulsed sensor signal in which a pulse was last registered.

9. The method of claim 1 comprising specifying the speed profile with one or more interference frequencies in an audible frequency range.

10. A motor-adjustable steering column for a motor vehicle, the motor-adjustable steering column being configured to perform the method of claim 1.

11. A motor-adjustable steering column for a motor vehicle, comprising:
a supporting unit;
an actuating unit supported by the supporting unit;
a steering spindle rotatably supported in the actuating unit;
an adjustment drive for adjusting the actuating unit relative to the supporting unit;
a control unit for controlling the adjustment drive;
an evaluation unit that determines a manipulated variable for the control unit; and
a sensor for determining an adjustment speed of the actuating unit,
wherein the adjustment drive, the sensor, and the control unit are integrated into a control loop for controlling the adjustment drive based on a control deviation between a specifiable speed profile and the adjustment speed, wherein the control unit identifies, based on the manipulated variable, an inconsistency in a controlled system of the control loop and determines a position of the steering column based on the identified inconsistency.

* * * * *